(12) United States Patent
Moosmann et al.

(10) Patent No.: US 8,407,664 B2
(45) Date of Patent: *Mar. 26, 2013

(54) SOFTWARE MODEL BUSINESS OBJECTS

(75) Inventors: Gerd Moosmann, Pforzheim (DE); Jens Freund, Heidelberg (DE); Peter Latocha, Maisch (DE); Stefan Kaetker, Dossenheim (DE)

(73) Assignee: SAP AG, Walldorf (DE)

( * ) Notice: Subject to any disclaimer, the term of this patent is extended or adjusted under 35 U.S.C. 154(b) by 1272 days.

This patent is subject to a terminal disclaimer.

(21) Appl. No.: 11/322,612

(22) Filed: Dec. 30, 2005

(65) Prior Publication Data

US 2007/0220046 A1  Sep. 20, 2007

(51) Int. Cl.
   *G06F 9/44* (2006.01)
(52) U.S. Cl. ......... 717/104; 717/105; 717/106; 717/107
(58) Field of Classification Search ................. 717/104, 717/105, 106, 107; 709/203; 707/10, 100
   See application file for complete search history.

(56) References Cited

U.S. PATENT DOCUMENTS

| | | |
|---|---|---|
| 4,947,321 A | 8/1990 | Spence et al. |
| 5,550,734 A | 8/1996 | Tarter et al. |
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |

(Continued)

FOREIGN PATENT DOCUMENTS

| | | |
|---|---|---|
| WO | 00/23874 | 4/2000 |
| WO | WO 2004/083984 | 9/2004 |

(Continued)

OTHER PUBLICATIONS

Ravichandran, T. "Special Issue on Component-Based Software Development", 2003, The Data Base for Advances in Information Systems, p. 45-46.*

(Continued)

*Primary Examiner* — Qamrun Nahar
(74) *Attorney, Agent, or Firm* — Fish & Richardson P.C.

(57) ABSTRACT

Methods and apparatus, including computer program products, for defining a software model business object are described. A plurality of business objects and interactions between these business objects are defined. Each business object is operable to encapsulate business data and can be associated with exactly one process component. Each of the process components characterizes software implementing a respective and distinct process and defines a respective at least one service interface for communicating and interacting with business objects in other process components. Moreover, all communication and interaction between process components takes place through the respective interfaces of the process components. Additionally, the interactions among business objects in different deployment units occur solely via the process component interfaces.

22 Claims, 15 Drawing Sheets

U.S. PATENT DOCUMENTS

| | | | |
|---|---|---|---|
| H1830 H | 1/2000 | Petrimoulx et al. |
| 6,028,997 A | 2/2000 | Leymann et al. |
| 6,049,838 A | 4/2000 | Miller et al. |
| 6,070,197 A | 5/2000 | Cobb et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,208,345 B1 | 3/2001 | Sheard et al. |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,789,252 B1 | 9/2004 | Burke et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,448,022 B1 | 11/2008 | Ram et al. |
| 7,451,432 B2 | 11/2008 | Shukla et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,904,350 B2 | 3/2011 | Ayala et al. |
| 7,925,985 B2 | 4/2011 | Moore |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |

| | | |
|---|---|---|
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1* | 6/2005 | Purewal ............... 709/203 |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1* | 11/2005 | Able et al. ............... 707/10 |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1* | 5/2006 | Buchmann et al. ........ 707/100 |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | Von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1 | 7/2007 | Kaetker et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0233541 A1 | 10/2007 | Schorr et al. |
| 2007/0233574 A1 | 10/2007 | Koegler et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070336 A1 | 3/2010 | Koegler et al. |

FOREIGN PATENT DOCUMENTS

WO    WO 2005/114381    12/2005

OTHER PUBLICATIONS

Astudillo, H. "How conceptual system architecture leads to business process", 2000, ACM, p. 35-36.*

He, J. et al., "Component-Based Software Engineering: The Need to Link Methods and Their Theories", Theoretical Aspects of Computer ICTAC 2005. Second International Colloquium. Proceedings (Lecture notes in Computer Science vol. 3722) Springer-Verlag Berlin, Germany, (Oct. 2005), p. 71-94.

Pilhofer, F., "Writing and Using CORBA Components", 17 pages [online] Apr. 2002 [retrieved on Feb. 28, 2007]. Retrieved from the Internet: <URL: http://www.fpx.de/MicoCCM/download/mico-ccm.pdf>.

SAP AG, International Search Report of PCT/EP2006/012621 filed Dec. 29, 2006, p. 1-12.

Sharifi, M. et al., "CORBA Components Collocation Optimization Enhanced with Local ORB-Like Services Support", On the Move to Meaningful Internet Systems, (2004): COOPIS, ODA and ODBASE. OTM Confederated Conferences COOPIS, DOA and ODBASE 2004. Proceedings Part II (Lecture Notes in Computer Science vol. 3291), Springer-Verlag, Berlin, Germany (2004), pp. 1143-1154.

Cowan, D.D. et al.: "Application Integration: Constructing Composite Applications from Interactive Components", Software Practice & Experience, Wiley & Sons, Bognor Regis, GB, vol. 23, No. 3 (Mar. 1993), pp. 255-275.

Nori A. K. et al.: "Composite Applications: Process Based Application Development", Lecture Notes in Computer Science, Springer Verlag, Berlin, DE, vol. 2444 (Aug. 2003), pp. 48-53.

SAP AG: "Designing Cross Solutions" SAP XAPPS, [online], Sep. 2003, pp. 1-2 [retrieved on Jul. 7, 2007]. Retrieved from the Internet: <URL: http://www.sap.com/belux/platforrn/netweaver/pdf/BWP_CAF.pdf>.

Vergil Technology Ltd. "Vergil Composite Application Builder Suite" Product Datasheet, [online] 2003, pp. 1-5 [retrieved on Jul. 23, 2007]. Retrieved from the Internet: <URL:http://www.webservicesmall.com/docs/VCAB_datasheet.pdf>.

Woods, D., "Packaged Composite Applications: A Liberating Force for the User Interface", Internet Citation, [online], Oct. 2003, 4 pages [retrieved on Oct. 17, 2005]. Retrieved from the Internet: <URL: http://www.sapdesignguild.org/editions/edition7/print_composite_applications.asp>.

Bin et al.; "Component Model Optimization for Distributed Real-Time Embedded Software"; IEEE International Conference on Systems, Man and Cybernetics; Oct. 13, 2004; 6 pages.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cox et al.; "A Formal Model for Component Based Software"; IEEE; Aug. 7, 2002; 8 pages.

Ferscha et al.; "A Light-Weight Component Model for Peer-to-Peer Applications"; IEEE; Mar. 23, 2004.

Finin et al.; "KQML as an Agent Communication Language"; retrieved on Jul. 26, 2011; pp. 456-463. <http://portal.acm.org/citation.cfm?id=191322>.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,236 on Oct. 28, 2010; 19 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Office Action issued in U.S. Appl. No. 11/323,634 on Apr. 29, 2011; 8 pages.

Office Action issued in U.S. Appl. No. 11/322,973 on Dec. 7, 2010; 13 pages.

Office Action issued in U.S. Appl. No. 11/322,973 on May 27, 2011; 15 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 11/967,483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Notice of Allowance issued in U.S. Appl. No. 12/333,085; Sep. 13, 2010; 8 pages.

Office Action issued in U.S. Appl. No. 12/233,087 on Aug. 18, 2011; 42 pages.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.

Notice of Allowance issued in U.S. Appl. No. 12/233,534 on May 16, 2011; 12 pages.

Notice of Allowance issued in U.S. Appl. No. 11/322,382 on Sep. 20, 2010; 6 pages.

Notice of Allowance issued in U.S. Appl. No. 11/322,382 on Jan. 6, 2011; 7 pages.

Notice of Allowance issued in U.S. Appl. No. 11/322,382 on Jul. 25, 2011; 5 pages.

Notice of Allowance issued in U.S. Appl. No. 11/322,610 on Sep. 23, 2010; 6 pages.

Notice of Allowance issued in U.S. Appl. No. 11/322,610 on Dec. 22, 2010; 6 pages.

Notice of Allowance issued in U.S. Appl. No. 11/322,610 on Mar. 31, 2011; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowanced issued in U.S. Appl. No. 11/322,398 on May 27, 2011; 21 pages.

Notice of Allowance issued in U.S. Appl. No. 11/396,259 on Oct. 15, 2010; 6 pages.

Notice of Allowance issued in U.S. Appl. No. 11/396,259 on Jan. 20, 2011; 6 pages.

Notice of Allowance issued in U.S. Appl. No. 11/396,259 on Aug. 5, 2011; 7 pages.

Notice of Allowance issued in U.S. Appl. No. 11/396,288; Dec. 28, 2010; 4 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,250 on Mar. 2, 2011; 13 pages.

Notice of Allowance issued in U.S. Appl. No. 11/396,250 on Jun. 24, 2011; 5 pages.

Notice of Allowance issued in U.S. Appl. No. 11/396,258 on Nov. 16, 2010; 8 pages.

Notice of Allowance issued in U.S. Appl. No. 11/396,258 on Jun. 28, 2011; 9 pages.

Notice of Allowance issued in U.S. Appl. No. 11/322,851 on Sep. 2, 2011; 8 pages.

Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Intuit Canada Ltd.; "Startup Guide—QuickBooks Basic for Windows, QuickBooks Pro for Windows, QuickBooks Premier for Windows"; 2002; 230 pages.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Lambert et al.; "Supply Chain Metrics"; International Journal of Logistics Management; vol. 12, No. 1; 2001; pp. 1-19.
Linthicum, D.S.; "Chapter 9: RPCs, Messaging, and B2B Application Integration"; B2B Application Integration: E-Business Enable Your Enterprise; 2001; pp. 167-181.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schmid, H.A.; "Business Entity Components and Buisness Process Components"; Joop; vol. 12, No. 6; Oct. 1999; pp. 6-10, 12-15.
Schultz, G.J.; "Keeping SCOR on Your Supply Chain: Basic Operations Reference Model Updates with the Times"; Information Strategy: The Executive's Journal; Summer 2003; pp. 12-20.
Singh, I. et al.; "Designing Enterprise Applications with the J2EE Platform, Second Edition"; Jun. 15, 2002.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
"American Software Announces ASP Pricing Model for It's a-Applications Expense Business Solution"; PR Newswire; Mar. 6, 2000; 2 pages.
Anon.; "Sequent Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports 13,000 MAS 90 for Windows Shipments in First Nine Months of Availability"; PR Newswire; Apr. 28, 1997.
Arch-int, S. et al.; "Development of Industrial Information Systems on the Web Using Busienss Components"; Computers in Industry; vol. 60; 2003; pp. 231-250.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyers' Guide to Software for Purchasing 2000.(Directory)"; Purchasing, vol. 129, No. 1; p. 179; Jul. 13, 2000.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Cascallar, Eduardo et al.; "Assessment in the Evaluation of Self-Regulation as a Process"; Educational Psychology Review; vol. 18, No. 3; Sep. 2006; pp. 297-306.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Cool, David W.; "Activity Fund Accounting"; School Business Affairs; vol. 49, No. 6; Jun. 1983; pp. 50-52.
Deimel, A.; "The SAP R/3 Business Framework"; Software—Concepts & Tools; vol. 19, No. 1; 1998; pp. 29-36.
Duc et al.; "Uniform Object Modeling Methodology and Reuse of Real Time System Using UML"; EMSOFT '05; Sep. 19-22, 2005; pp. 44-47.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
"Hudson's Bay Company Realizes Fast ROI with the Oracle E-Business Suite"; PR Newswire; New York; Jan. 15, 2002; p. 1.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Mar. 25, 2009; 12 pages.
Office Action issued in U.S. Appl. No. 11/322,772; Dec. 9, 2009; 14 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041; Apr. 30, 2009; 25 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Office Action issued in U.S. Appl. No. 11/396,288; Jan. 2, 2009; 26 pages.
Office Action issued in U.S. Appl. No. 11/396,288; Apr. 15, 2008; 26 pages.
Office Action issued in U.S. Appl. No. 11/396,288; Aug. 19, 2009; 20 pages.
Office Action issued in U.S. Appl. No. 11/396,258; Nov. 25, 2009; 9 pages.
Notice of Allowance issued in U.S. Appl. No. 11/396,258 on Mar. 31, 2010; 9 pages.

Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/397,026; Jul. 21, 2009; 28 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/322,482; Jan. 7, 2010; 19 pages.
Notice of Allowance issued in U.S. Appl. No. 11/322,482; Jul. 13, 2010; 5 pages.
Office Action issued in U.S. Appl. No. 11/323,590; Jan. 9, 2009; 23 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 11/967,483; Aug. 20, 2010; 10 pages.
Office Action issued in U.S. Appl. No. 12/333,085; Jun. 25, 2009; 9 pages.
Office Action issued in U.S. Appl. No. 12/333,085; Mar. 23, 2010; 5 pages.

* cited by examiner

SOFTWARE MODEL BUSINESS OBJECTS

TECHNICAL FIELD

This disclosure relates to modeling software systems, and more particularly to modeling the composition and interaction of components in a software system.

BACKGROUND

The subject matter of this patent applications relates to modeling software systems, and more particularly to modeling the composition and interaction of components in a software system.

Enterprise software systems are generally large and complex. Such systems can require many different components, distributed across many different hardware platforms, possibly in several different geographical locations. Typical software modeling systems may not be able to reduce this complexity for end users. In order to design, configure, update or implement an enterprise software system, one is required to understand details of the system at varying levels, depending on his or her role in designing, managing or implementing the system. For example, a systems administrator may need a high-level technical understanding of how various software modules are installed on physical hardware, such as a server device or a network, and how those software modules interact with other software modules in the system. A person responsible for configuring the software may need a high-level functional understanding of the operations that each functional component provides. An application designer may need a low-level technical understanding of the various software interfaces that portions of the application require or implement. And an application developer may need a detailed understanding of the interfaces and functionality he or she is implementing in relation to the remainder of the system.

SUMMARY

A plurality of business objects and interactions between these business objects are defined. Each business object is operable to encapsulate business data and can be associated with exactly one process component. Each of the process components characterizes software implementing a respective and distinct process and defines a respective at least one service interface for communicating and interacting with business objects in other process components. Moreover, all communication and interaction between process components takes place through the respective interfaces of the process components. Additionally, the interactions among business objects in different deployment units occur solely via the process component interfaces.

The process components can characterize inbound operations and/or outbound operations. The inbound operations handle incoming messages associated with a modification of reading of data encapsulated in a business object associated with the process component. The outbound operations handle outgoing messages associated with a modification or reading of data encapsulated in at least one business object associated with another process component.

The process components may also include process agents that characterize operations that enable communications between a business object associated with the process component and a business object associated with any other process component. The process agents are operable to enable communication through the service interface of its respective process component. An inbound agent can characterize an inbound operation to handle incoming messages. Inbound agents can also be operable to receive a message of a first type and convert it into a message of a second type. An outbound process agent can characterize an outbound operation to transmit outgoing messages to an external process component.

An integration scenario can be formed by logically associating a plurality of process components in such a manner as to realize a business scenario. A plurality of such integration scenarios may be generated and populated in a catalog. Data associated with the catalogs, integration scenarios, deployment units, and process components may be stored in a data repository to allow, for example, reuse of such information.

The process components can be associated with different deployment units that each characterize independently operable software that can, in some variations, be deployed on separate platforms. Communications between process components in different deployment units can be message based. Communications between process components within the same deployment unit need not be message based, and in some cases, such communications can utilize shared memory, database records, and the like. In addition, in some variations, a deployment unit may include a business object that is not associated with a process component.

In an interrelated aspect, a plurality of business objects, each business object being operable to encapsulate business data, are defined. Thereafter, each of the business objects are associated with exactly one process component (or with a deployment unit if the business object is not associated with a process component). Each of the process components characterizes software implementing a respective and distinct process and defines a respective at least one service interface for communicating and interacting with other business objects in other process components. In addition, all communication and interaction between process components takes place through the respective interfaces of the process components.

Computer program products, which can be tangibly encoded on computer readable-material, are also described. Such computer program products can include executable instructions that cause a computer system to implement one or more of the acts and/or components described herein.

Similarly, computer systems are also described that can include a processor and a memory coupled to the processor. The memory can encode one or more programs that cause the processor to implement one or more of the acts and/or components described herein.

The subject matter described herein provides many advantages. A model provides modeling entities to represent aspects of a software system. Multiple views of the model are provided in a user interface. The model views offer varying levels of detail, allowing users to focus on the information that is important for their task. Model entities can be reused and correspond to reusable software that implements functionality corresponding to the model entity. The model supports dynamic mapping between incompatible message formats. A model can incorporate external components. The models can be used to generate metadata, which can be stored in a repository and used in various downstream processes and tools.

Moreover, the subject matter described herein provides a logical abstraction of how various software modules can interact to effect a business scenario. In particular, effective use can be made of process components as units of software reuse, to provide a design that can be implemented reliably in a cost effective way. Deployment units, each of which is deployable on a separate computer hardware platform independent of every other deployment unit, enable a scalable design. Furthermore, service interfaces of the process components can define a pair-wise interaction between pairs of process components that are in different deployment units in a scalable manner.

One implementation of the subject matter described in this specification provides all of the above advantages.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In the context of this document, a model is a representation of a software system, part of a software system, or an aspect of a software system. A model can be associated with one or more views. A view of a model represents a subset of the information in the model. For purposes of discussion, the term "model" will be used to refer to both a model or a view of the model. A modeling system can be used to create, modify and examine a model. A model can be used in a software development process to describe or specify a software application, or parts or aspects of a software application, for developers implementing or modifying the application. The model specifies the design to a useful level of detail or granularity. A compliant implementation of the modeled functionality will conform to the specification represented by the model.

Figure 1:
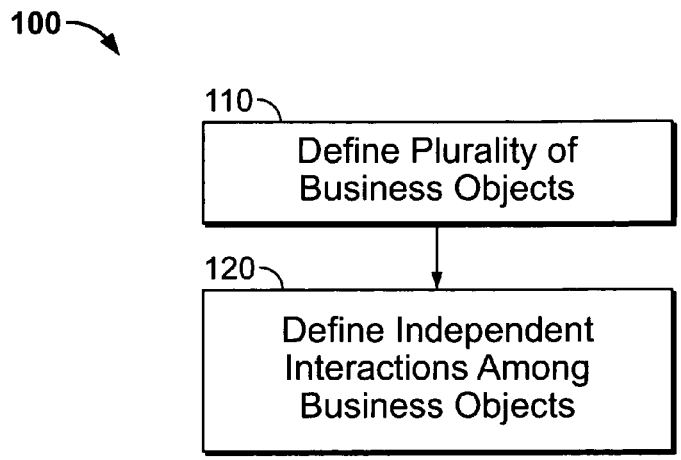
FIG. 1 is an illustration of a modeling method.

FIG. 1 is a process flow diagram illustrating a method 100 in which, at 110, a plurality of business objects are defined. Each business object is operable to encapsulate business data and is associated with exactly one process component. Each of the process components characterizes software implementing a respective and distinct process. Moreover, each of the process components defines a respective at least one process interface for communicating and interacting with business objects in other process components, and all communication and interaction between process components takes place through the respective interfaces of the process components. At 120, interactions among the plurality of business objects are defined. These interactions among business objects in different deployment units occur solely via the process component interfaces.

Figure 2:
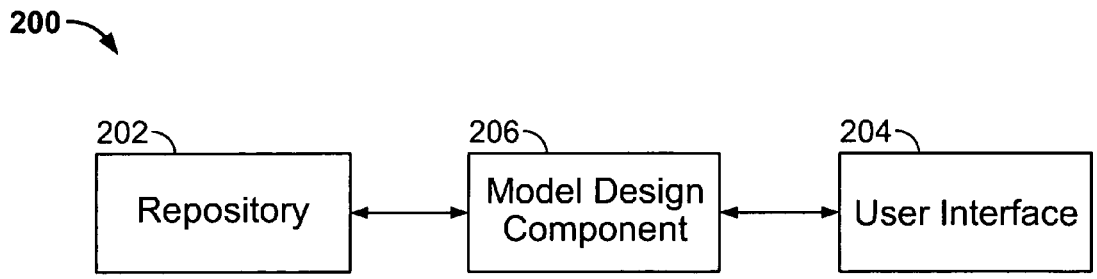
FIG. 2 is an illustration of a modeling system.

FIG. 2 illustrates a modeling system 200. An interactive graphical user interface (GUI) 204 allows a user to create, inspect and modify a model. The GUI 204 can present a model in different views offering differing levels of detail. This allows users to focus on information that is appropriate to their role or the task at hand. A model design component 206 coupled to the GUI 204 provides one or more tools for modifying and manipulating a model, as will be discussed below. A repository 202 is capable of storing one or more models and associated information. By way of illustration and without limitation, the repository can incorporate one or more files, databases, services, combinations of these, or other suitable means for providing persistent storage of model information.

Figure 3:
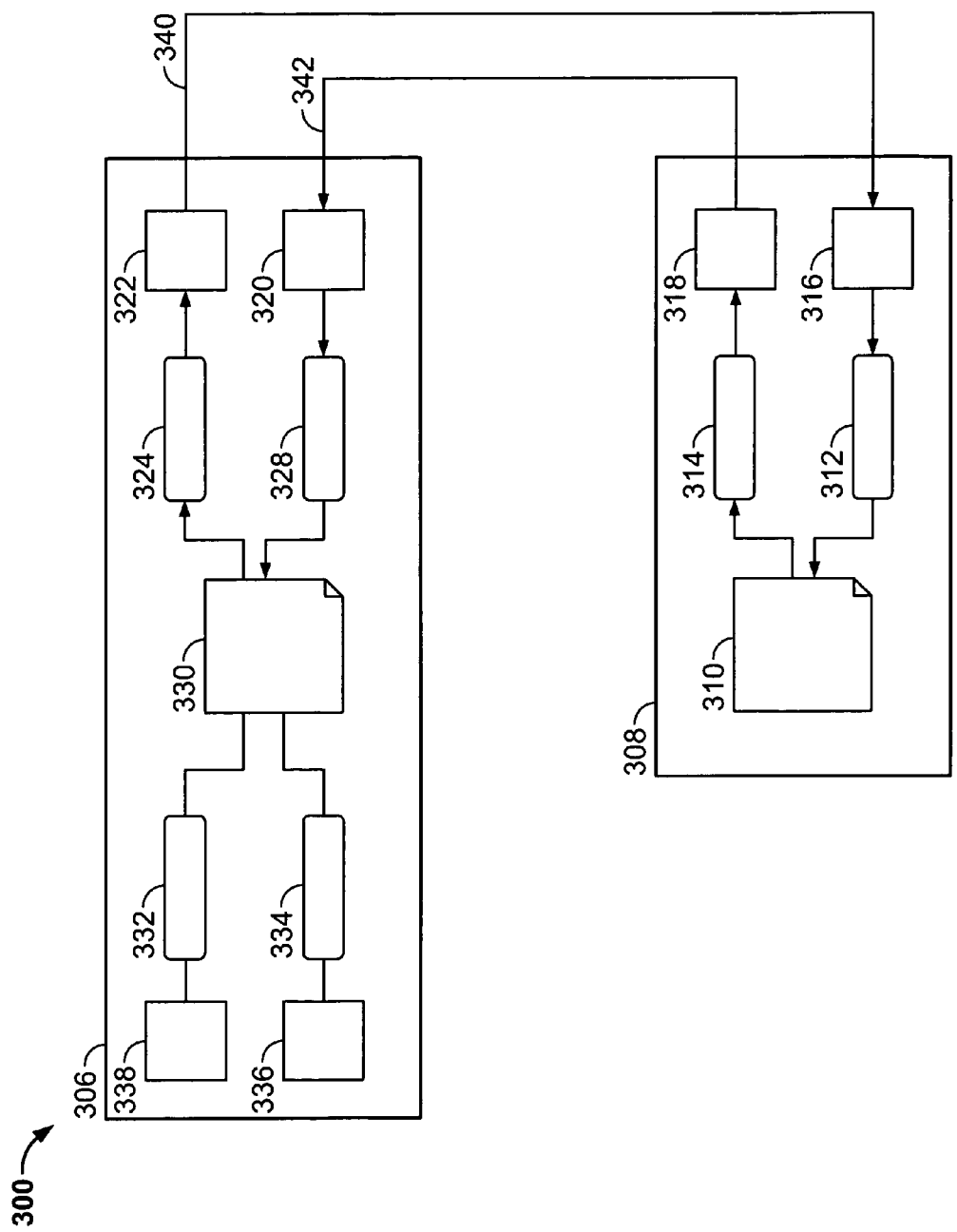
FIG. 3 is an illustration of process component modeling entities.

FIG. 3 is an illustration of process component modeling entities (or "process components") in a model. For brevity, where the sense is clear from the context, the term "process component" will be used to refer both to the modeling entity and to an implementation in a software system of a process represented by that modeling entity. The same dual use will be made of other terms to refer both to the modeling entity and an implementation represented by the entity, where the meaning is clear from the context.

A process component is a software package that realizes a business process and exposes its functionality as services. The functionality contains business transactions. A process component contains one or more semantically related business objects (e.g., 330, 310). A business object belongs to no more than one process component.

Process components are modular and context-independent. Context-independent means that a process component is not specific to a given integration scenario. (Integration scenarios are described later.) Therefore, process components are reusable, that is, they can be used in different integration scenarios.

A process component has one or more service interface modeling entities (316, 318, 320, 322, 336, 338) (or "interfaces"). An interface is a named grouping of one or more operations. It specifies offered (inbound service interface) or used (outbound service interface) functionality. While in general process components will have service interfaces, it is permissible to define a process component having no service operations. This would be appropriate, for example, for process components that inherently or by design interact only with process components deployed on the same hardware platform, in which circumstances a non-service method of interacting, e.g., through shared memory or database records, might be preferred.

An operation belongs to exactly one process component. A process component generally has multiple operations. An operation is the smallest, separately-callable function, described by a set of data types used as input, output, and fault parameters serving as a signature. An operation can use multiple message types for inbound, outbound, or error messages. An operation is specific to one interface, i.e., the same operation cannot be used in more than one interface.

Operations are described for purposes of exposition in terms of process agents. A process agent (or "agent") is an optional modeling entity representing software that implements an operation. Operations can be implemented through other conventional techniques. Operations (and hence agents) can be synchronous or asynchronous, and inbound or outbound.

Synchronous outbound operations send synchronous request messages and process response messages. Synchronous inbound operations respond to messages from synchronous outbound operations. Synchronous communication is when a message is sent with the expectation that a response will be received promptly. Asynchronous communication comes with the expectation that a response will be provided by a separate operation invoked at a later point in time.

An asynchronous outbound operation is specific to a sending business object. If the asynchronous outbound operation is triggering a new communication to another process component, it is specific for the triggered process component. However, the same asynchronous outbound process operation can be used for two operations which are part of the same message choreography. If the asynchronous outbound operation is sending only a confirmation (not triggering), it might be re-used for different receiving process components.

Inbound operations are called after a message has been received. Based on a business object's status, inbound operations may initiate communication across deployment units, may initiate business-to-business (B2B) communication, or both by sending messages using well-defined services.

The model can describe the potential invocation by one process component of an operation on another process component. Graphically, this is depicted as an arc (340, 342) in FIG. 3 connecting the two process components 306 and 308. Invocation of an operation on a process component is always accomplished by another process component sending a message to the process component, if the two process components are part of different deployment units, which are described below. Interaction between two process components in the same deployment unit, on the other hand, can be implemented by the passing of messages, as described, or it can be implemented by the use of resources, e.g., data objects, database records, or memory, that are accessible to both process components when they are deployed.

Messages are described by message modeling entities (or "messages") in the model.

An process agent can be associated with a single interface. For example, interface 338 is associated with process agent 332, interface 336 is associated with process agent 334, interface 316 is associated with process agent 312, and interface 318 is associated with process agent 314. In one variation, each operation is associated with a process agent.

An output operation generally responds to a change in a business object associated with the operation. The operation will generally perform some processing of the data of the business object instance whose change triggered the event. An outbound operation triggers subsequent business process steps by sending messages using well-defined outbound services to another process component, which generally will be in another deployment unit, or to a business partner. For example, outbound process agent 324 in process component 306 can invoke an operation of interface 322 to send a message that will be received by the inbound process agent 312 in process component 308. The message is routed to a specific operation in interface 316 according to the signature or type of the message, which the inbound process agent 312 handles.

Inbound process agents when implemented are pieces of software that are used for the inbound part of a message-based communication. An inbound process agent starts the execution of the business process step requested in a message by creating or updating one or multiple business object instances, e.g., for associated business objects (330, 310) in response to receiving a message. Outbound process agents when implemented can send messages in response to a business object changing or interaction with a business object. For example, the inbound process agent 312 may modify business object 310, thus triggering outbound process agent 314 to send a message to the inbound process agent 328. If two operation invocations are part of the same message choreography, they are associated with the same process agent.

A business object model entity models a business object. A business object is a representation of a type of a uniquely identifiable business entity (an object instance) described by a structural model and zero or more service interfaces. Implemented business processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

Business process objects are associated with exactly one process component. Master data objects are either associated with exactly one process component or exactly one deployment unit.

Business objects residing in a foundation layer are called business foundation objects. The foundation layer is deployed on every platform, and its business objects, process components, and reuse services are available to be used by all application scenarios. It is assumed that business objects in the foundation layer will be local in all integration scenarios and can be directly accessed synchronously from business objects within deployment units in an application layer. Business objects in the foundation layer can be associated with more than one process component.

Figure 4A:
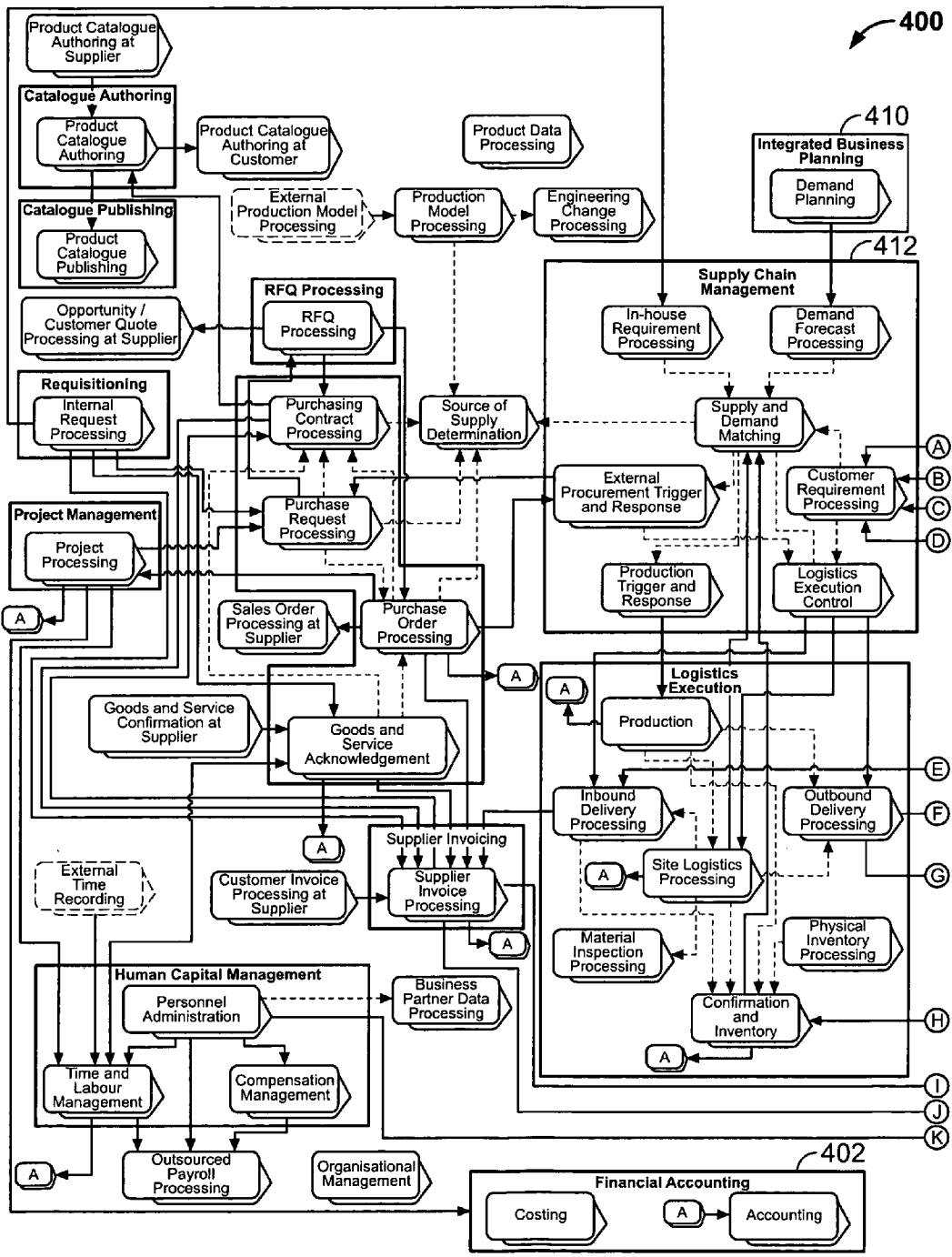
FIGS. 4A-C illustrate a process interaction map.
Figure 4B:
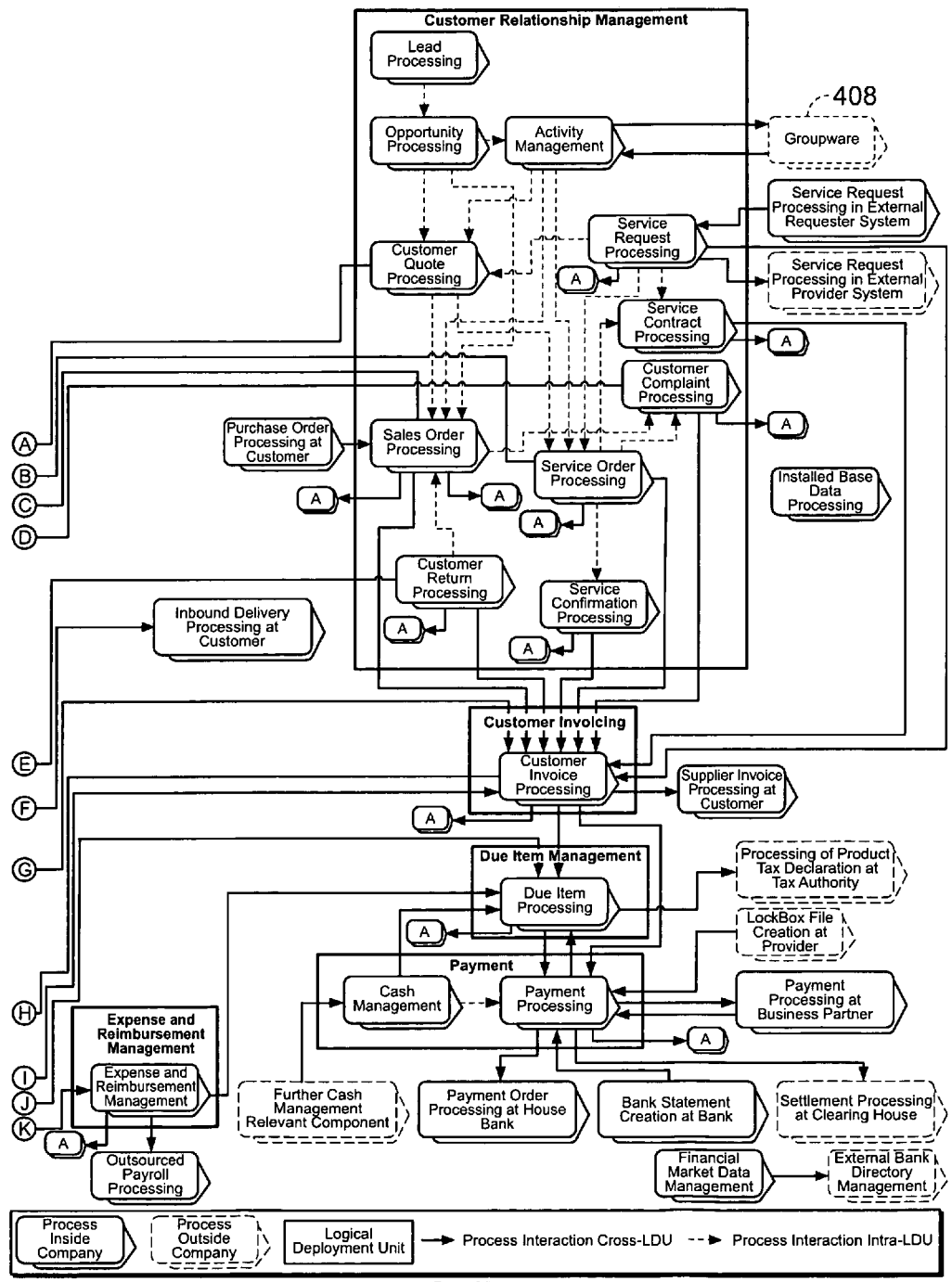
Figure 4C:
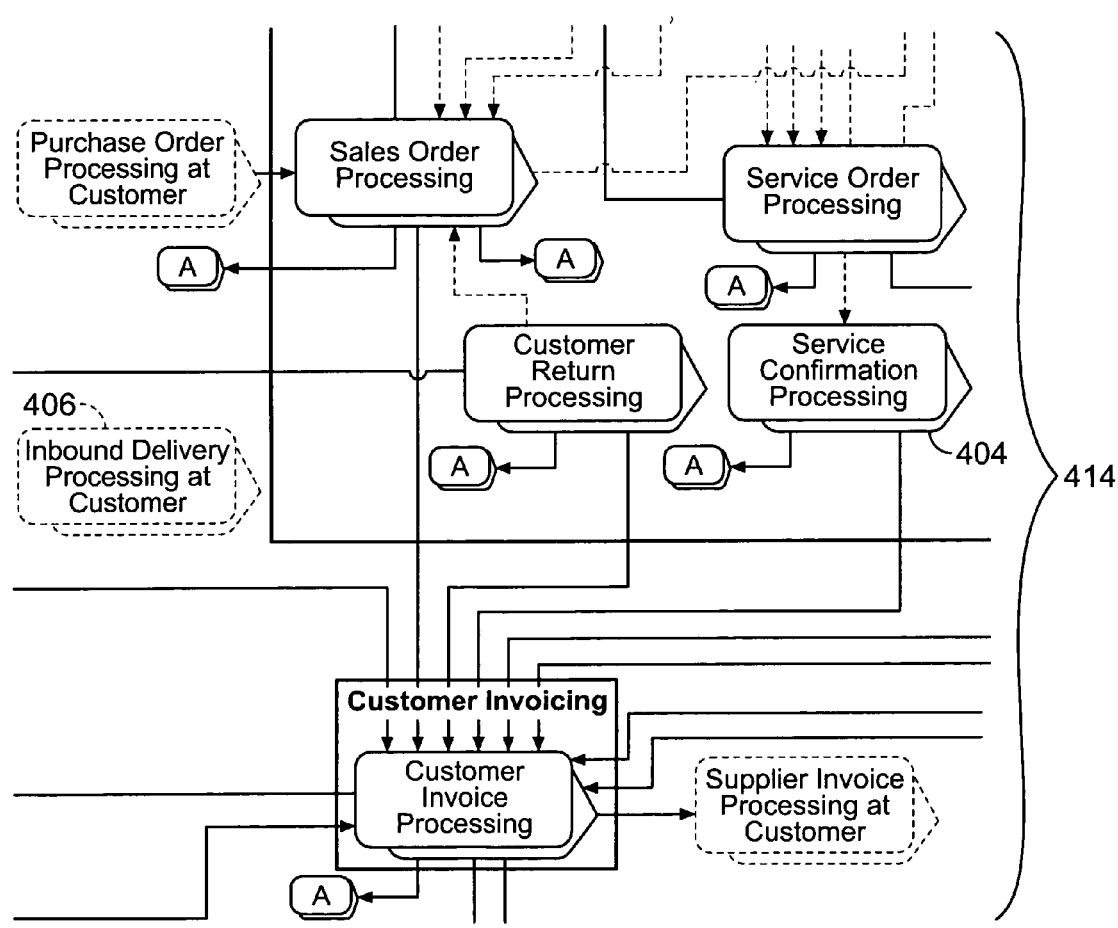

FIGS. 4A-C illustrate a process interaction map 400. A process interaction map is a modeling entity that describes interactions between two or more process components. It can be presented in the GUI 204 (FIG. 2) by the model design component 206 as a circuit diagram, for example, with arcs indicating potential interactions between process components. In a visual rendition of the map 400, process components are represented as icons (e.g., 404, 406, 408). So called "external" process components are indicated with dashed lines (e.g., 406, 408). External process components are shown to place the modeled process components in their operational context relative to another system, e.g., a system belonging to another company, such as a customer or other third party. The GUI 204 allows a user to connect and disconnect process components (i.e., to indicate potential interactions), move process components, and zoom in a specific portion of the map 400 to see more detail, as indicated by view 414.

Groups of process components can be organized into scenarios and deployment units. An integration scenario modeling entity (or "scenario") describes a group of process components that interact directly or indirectly (i.e., through one or more other process components) with each other. A process component belongs to one deployment unit. Scenarios are discussed below.

A deployment unit modeling entity (e.g., 402, 410, 412) models a deployment unit, which includes one or more process components that can be deployed together on a single computer system platform.

Separate deployment units can be deployed on separate physical computing systems and include one or more process components. For example, a physical system can be a cluster of computers having direct access to a common database. The process components of one deployment unit interact with those of another deployment unit only using messages passed through one or more data communication networks or other suitable communication channels. Thus, a deployment unit software entity deployed on a platform belonging to Company A can interact with a deployment unit software entity deployed on a separate platform belonging to Company B, allowing for business-to-business communication. Or deployment units in different divisions of the same company can interact with each other. More than one instance of a given deployment unit software entity can execute at the same time.

Figure 5:
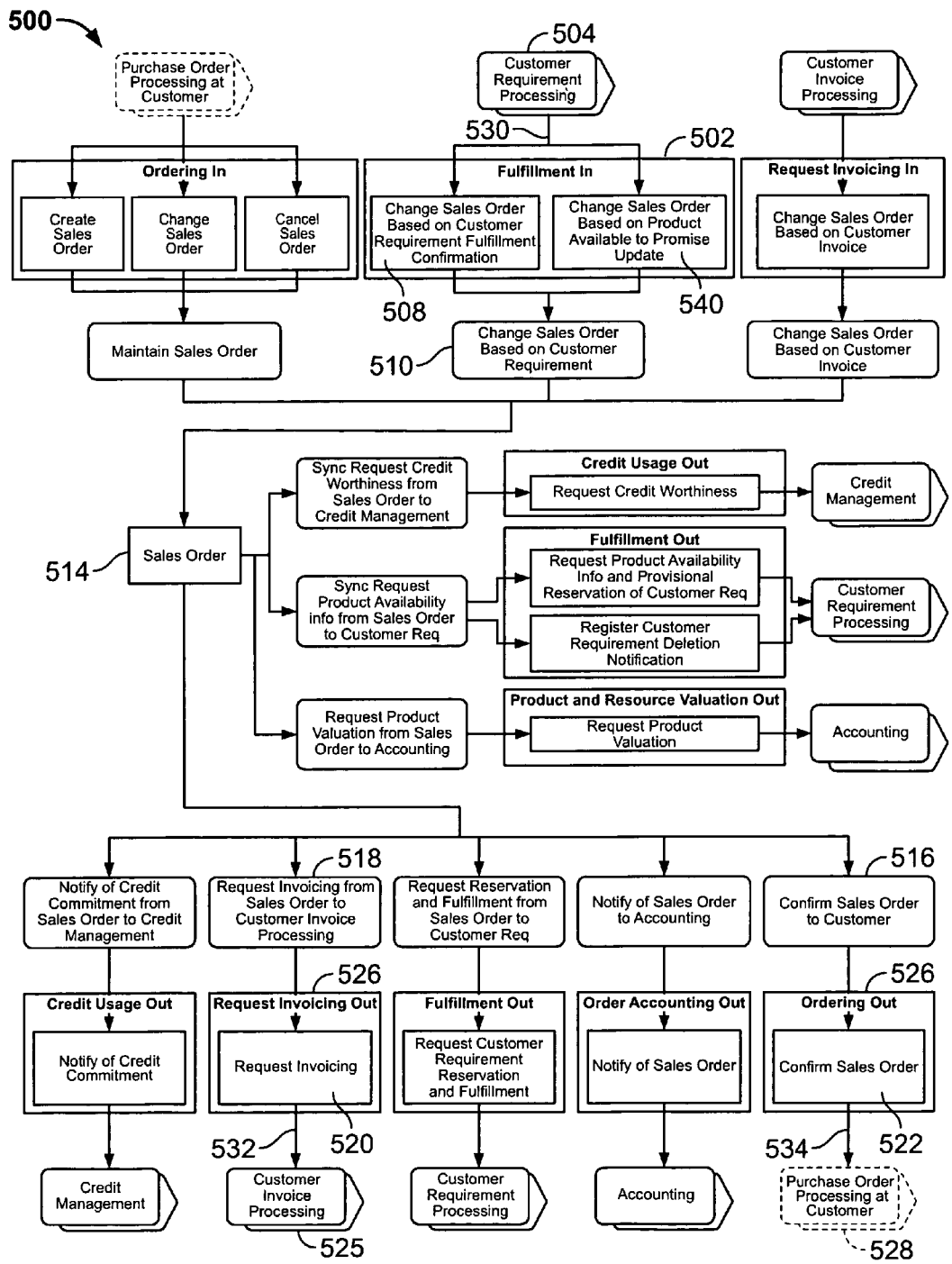
FIG. 5 is an illustration of a process component model.

FIG. 5 is an illustration of a process component model (PCM) 500. A PCM is a view of a model that incorporates the model entities associated with a particular process component. A PCM can also describe potential interactions between a process component and other process components in the same or in different deployment units. For example, the illustrated process component 500 can interact with a Customer Requirement Processing component 504 and a Customer Invoice Processing component 525. Moreover, a PCM can describe interaction with external process components that are controlled by third parties (e.g., 528).

The PCM models operations incorporated in a process component. For example, inbound operation Change Sales Order based on Customer Requirement Fulfillment Confirmation 508, and outbound operations Request Invoicing 520 and Confirm Sales Order 522. The arc 530 connecting the process component 504 to the interface 502 represents that the process component 504 can invoke an operation on that interface. The arcs 532 and 534 represent that the process component illustrated in 500 can invoke an operation on process components 525 and 528, respectively.

The PCM optionally models process agents (e.g., 510, 516, 518) corresponding to the process component's operations. For example, the Change Sales Order based on Customer Requirement inbound process agent 510 models processing or responding to a message routed to inbound operations 508 or 540. The inbound process agent 510, for example, will access and modify the Sales Order business object 514 as part of the processing, e.g., change the delivery date of goods or services on the sales order.

Process component 525 can receive one or more messages by way of outbound operation 520, as denoted by the arc 532 connecting outbound operation 520 to the process component 525. Based on the change associated with the business object 514, the Request Invoicing from Sales Order to Customer Invoice Processing outbound process agent 518 invokes operation 520 in interface 526 to send a message to process component 525. Likewise, external process component 528 can receive one or more messages sent by outbound operation 522, as denoted by the arc 534 connecting operation 522 to the process component 528. Based on the state or a state change associated with the business object 514, outbound process agent 516 can invoke operation 522 to send a message to external process component 528.

Figure 6:
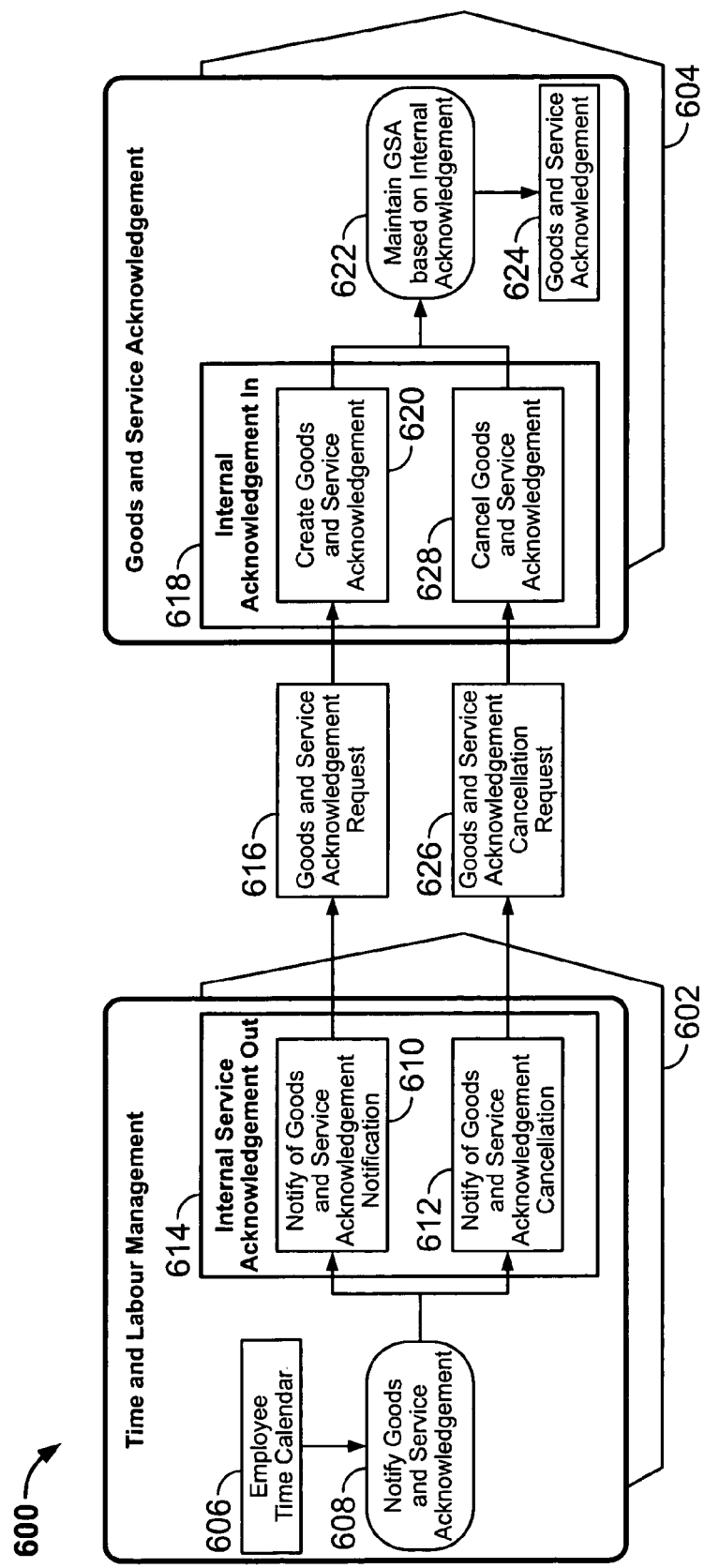
FIG. 6 is an illustration of a process component interaction model.

FIG. 6 is an illustration of a process component interaction model (PCIM) 600. PCIMs can be reused in different integration scenarios. A PCIM is a view of a model that incorporates relevant model entities associated with potential interaction between two process components (e.g., 602, 604). Interfaces, process agents and business objects that are not relevant to the potential interaction are excluded. The PCIM 600 shows interactions between a Time and Labor Management process component 602 and a Goods and Service Acknowledgement process component 604.

The Time and Labor Management process component 602 includes an Employee Time Calendar business object 606 that gives a read-only information of a calendar based overview of different time data (e.g., Planned working time, an absences and working time confirmation) of employees and their superposition (e.g., illness, vacation, etc). The Employee Time Calendar business object 606 may use a Notify Goods and Services Acknowledgement outbound process agent 608 to invoke a Notify of Goods and service Acknowledgement Notification operation 610 or a Notify of Goods and Service Acknowledgement Cancellation operation 612, which are both included in the Internal Service Acknowledgement Out interface 614. The Notify of Goods and service Acknowledgement Notification operation 610 notifies the Goods and Service Acknowledgement process component 604 of a service provided by an external employee. The Notify of Goods and service Acknowledgement Notification operation 610 sends a Goods and Service Acknowledgement Request message 616 when an active employee time with Goods and Service Acknowledgement relevant information is created or changed.

The Goods and Service Acknowledgement process component 604 receives the Goods and Service Acknowledgement Request message 616 via an Internal Acknowledgement In interface 618. Upon receipt of the Goods and Service Acknowledgement Request message 616, a Create Goods and Service Acknowledgement operation 620 is invoked to create Goods and service Acknowledgement, and Time and Labor Management by initiating a Maintain GSA based on Internal Acknowledgment inbound process agent 622. The Maintain GSA based on Internal Acknowledgment inbound process agent 622 updates or creates a Goods and Service Acknowledgement business object 624 to report the receipt of goods and services. The Goods and Service Acknowledgement business object 624 may be used when employees of a company can confirm that they have received the goods and services they ordered through internal requests, purchasers, or designated recipients of goods and services, can confirm that they have received the goods and services they ordered on behalf of the employees for whom they are responsible, or suppliers or service providers can report that they have delivered the requested goods, or have rendered they requested services.

The Notify Goods and Services Acknowledgement outbound process agent 608 may also invoke the Notify of Goods and Service Acknowledgement Cancellation operation 612 to notify the Goods and Service Acknowledgement process component 604 of a cancellation of goods and service. The Notify of Goods and Service Acknowledgement Cancellation operation 612 sends a Goods and Service Acknowledgement Cancellation Request message 626 when an active employee time with Goods and Service Acknowledgement relevant information is cancelled. Upon receipt of the Goods and Service Acknowledgement Cancellation Request message 626, a Cancel Goods and Service Acknowledgement operation 628 is invoked to cancel Goods and service Acknowledgement. Next, the Maintain GSA based on Internal Acknowledgment inbound process agent 622 updates the Goods and Service Acknowledgement business object 624 to report the cancellation of goods and services.

The message format of a message sent by an outbound operation need not match the message format expected by an inbound operation. If the message formats do not match, and the message is transformed, or mapped. Message mapping is indicated by interposition of an intermediary mapping model element between the source and the destination of the message in a PCM or a PCIM (see below).

Figure 7A:
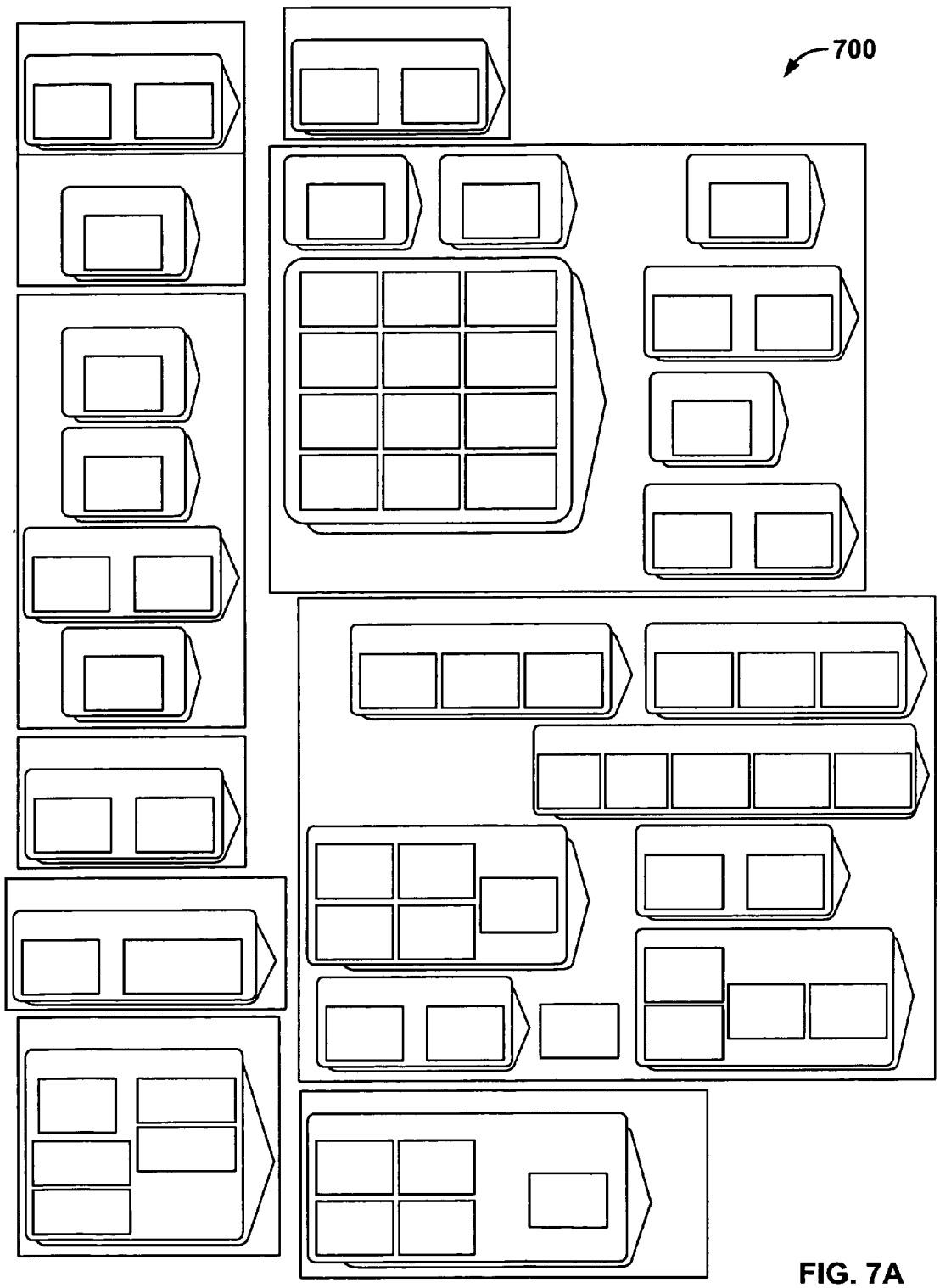
FIGS. 7A-B illustrate a business object map.
Figure 7B:
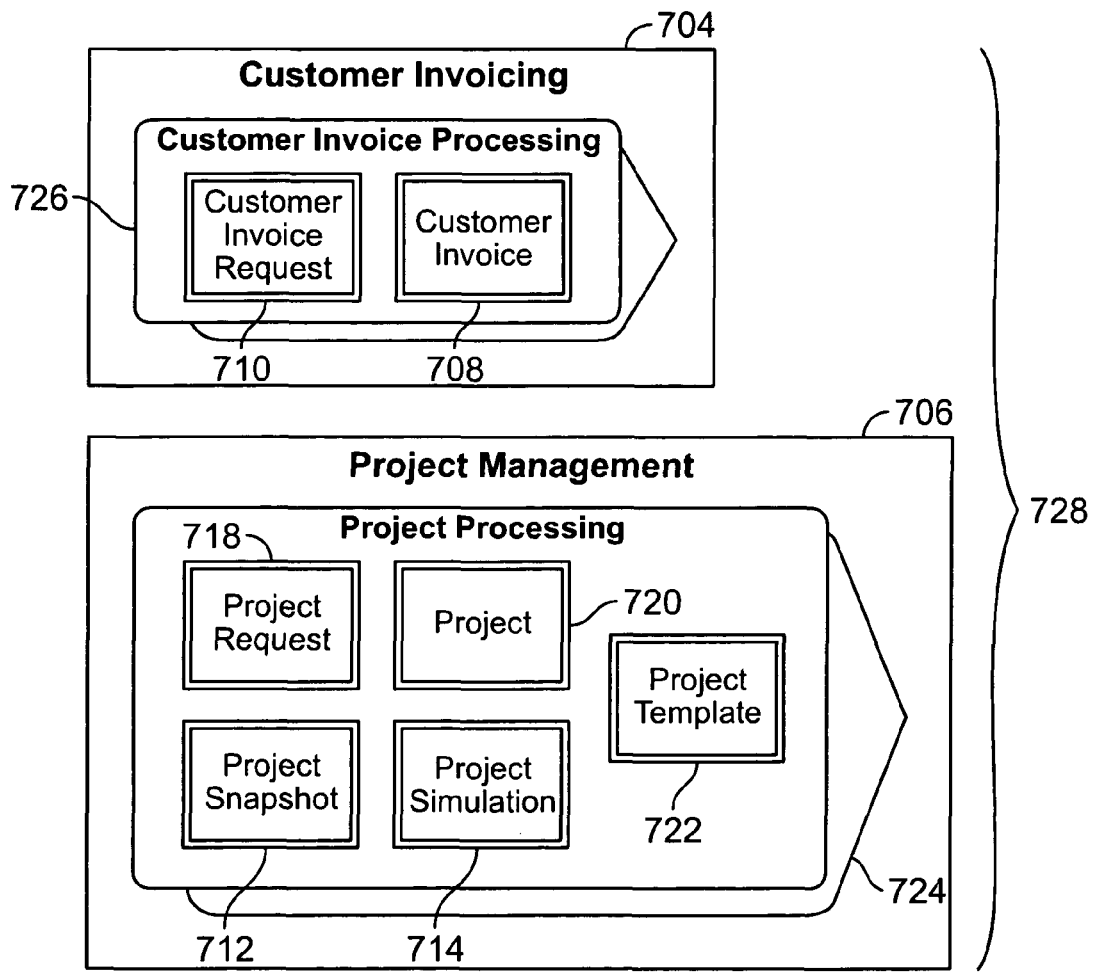

FIGS. 7A-B illustrate a business object map 700. A business object map is a view of a model that incorporates deployment units, process components, and business objects. Interfaces, operations and process agents are excluded from the view. Each model entity is only represented once in the business object map. Hence, the business object map is a representation of all deployment units, process components, and business objects. In the illustrated business object map 700, and as shown in the highlighted portion 728, a Customer Invoice Processing process component 726 in Customer Invoicing deployment unit 704 incorporates two business objects: a customer invoice request 710 and a customer invoice 708. A Project Processing process component 724 in a Project Management deployment unit 706 includes five business objects: a Project Request 718, a Project 720, a Project Snapshot 712, a Project Simulation 714, and a Project Template 722.

Figure 8:
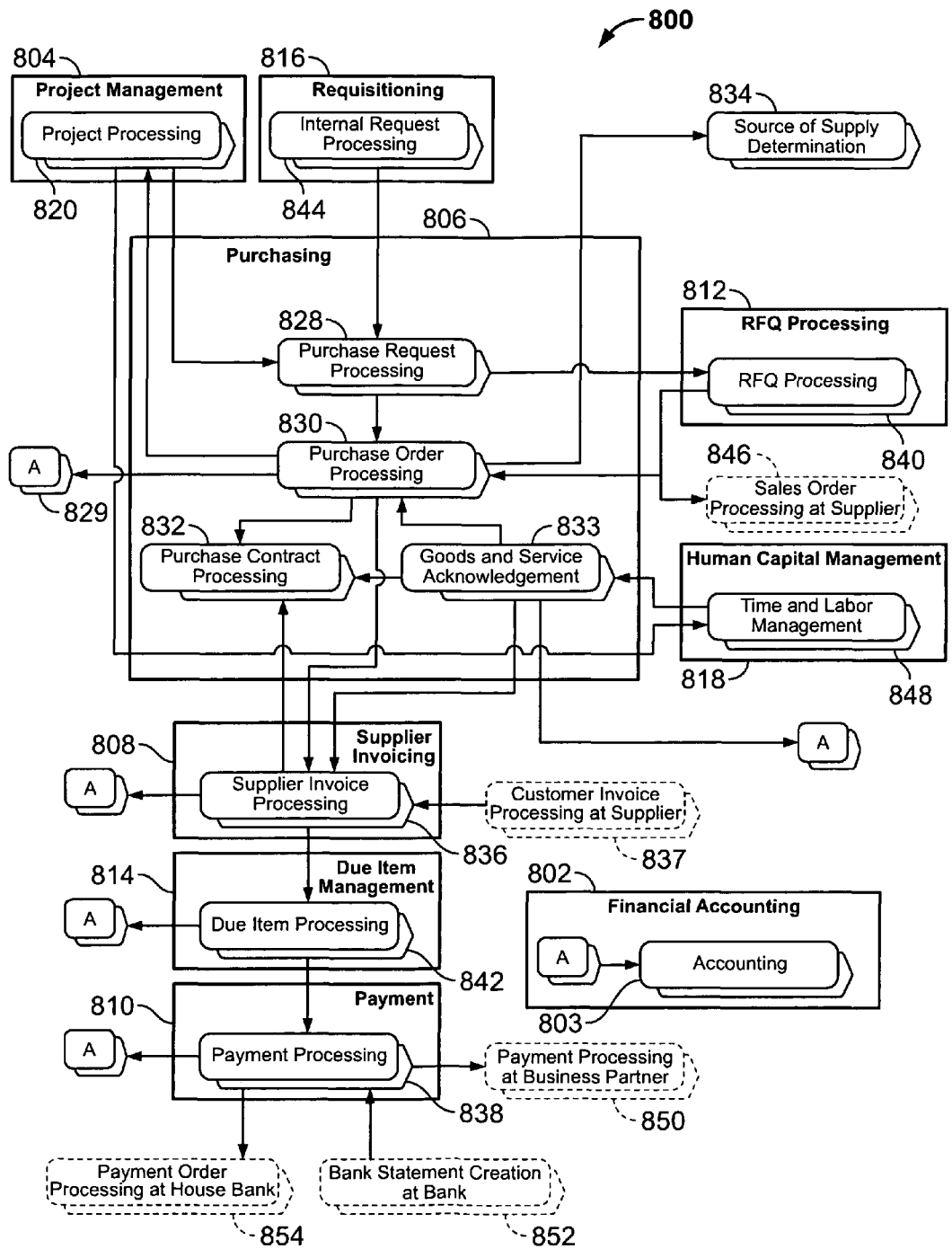
FIG. 8 is an illustration of an integration scenario model entity.

FIG. 8 is an illustration of an integration scenario model entity 800 (or "integration scenario"). An integration scenario is a realization of a given end-to-end business scenario. It consists of the process components and the interactions between them, which are required for its realization. A process component is only represented once in an integration scenario model, even though the actual flow in the software system might invoke the same process component multiple times. An integration scenario model entity describes at a high level the potential interaction between process components in one or more deployment units that are relevant to realization of the business scenario. For example, an integration scenario can be a set of process components and their interactions working together to realize a business scenario to achieve a business objective, such as selling products to generate revenue. Internal details of process components are not described, nor are details of process component interactions (e.g., interfaces, operations and messages).

The illustrated integration scenario 800 is for a service procurement software application. The service procurement application is software that implements an end-to-end process used to procure services. The scenario 800 includes nine deployment units: a Financial Accounting unit 802, a Project Management unit 804, a Purchasing unit 806, a Supplier Invoicing unit 808, a Payment unit 810, a RFQ Processing unit 812, a Due Item Management unit 814, a Requisitioning unit 816, and a Human Capital Management unit 818.

The Financial Accounting deployment unit 802 includes an Accounting process component 803 that records all relevant business transactions.

The Project Management deployment unit 804 includes a Project Processing component 820 that is responsible for structuring, planning, and executing measures or projects (e.g., short-term measures, complex projects, etc).

The Purchasing deployment unit 806 includes four process components: a Purchase Request Processing process component 828, a Purchase Order Processing process component 830, a Purchasing Contract process component 832, and a Goods and Service Acknowledgement process component 833.

The Purchase Request Processing process component 828 provides a request or instruction to the purchasing department to purchase specified goods or services in specified quantities within a specified time.

The Purchase Order Processing process component 830 includes a purchase order business object and a purchase order confirmation business object. The purchase order is a request from a purchaser to an external supplier to deliver a specified quantity of goods, or perform a specified service within a specified time. The purchase order confirmation is a communication from a supplier to a purchaser to advise that a purchase order has been received. In particular, a purchase order confirmation may advise the purchaser of the supplier accepting the purchase order, or the supplier proposing changes to the purchase order, or the supplier not accepting the purchase order.

The Purchasing Contract process component 832 handles an agreement between a purchaser and a supplier that details the supply of goods or the performance of services at agreed conditions. The Purchasing Contract process component includes the purchasing contract business object.

The Goods and Service Acknowledgement 833 includes a Goods and Service Acknowledgement business object. The Goods and service Acknowledgement business object is a document that states the recipient's, for example, a purchaser's, obligation to pay the supplier for goods received or services rendered. An invoice is normally created after the goods and service acknowledgement has been confirmed.

The Supplier Invoicing deployment unit 808 includes a Supplier Invoice Processing process component 836. The Supplier Invoice Processing process component 836 includes a supplier invoice business object and a supplier invoice request business object. The supplier invoice is a document that states the recipient's obligation to pay the supplier for goods received or services rendered. The invoice may be created after the goods and service acknowledgment has been confirmed. The supplier invoice request is a document that is sent to invoice verification, advising that an invoice for specified quantities and prices is expected and may be created through evaluation settlement. The system uses the invoice request as a basis for invoice verification, as well as for the automatic creation of the invoice. The Payment deployment unit 810 includes a Payment Process component 838. The Payment Processing process component 838 is used to handle all incoming and outgoing payments as well as represent the main database for a liquidity status.

The RFQ deployment unit 812 includes an RFQ Processing process component 840. An RFQ Processing deployment unit includes a Request for Response business object and a quote business object. The request for quotation (RFQ) is a description of materials and services that purchasers use to request responses from potential suppliers. Requests for Quotation can be one of the following types: a request for (price) information, a request for quote that may run over a certain period of time, a request for proposal in complex purchasing situation or live auctions that may be performed over a short time frame. The quote is a response to a request for quotation in which a supplier offers to sell goods and services at a certain price. The quote can be subject to complex pricing and conditions.

The Due Item Management deployment unit 814 includes a Due Item Processing process component 842. The Due Item Processing process component 842 is used to manage all payables, receivables from service and supply and corresponding sales including a withholding tax.

The Requisitioning deployment unit 816 includes an Internal Request Processing process component 844. The Internal Request Processing deployment unit 816 includes an Internal Request business object. Employees of a company may make an internal request for the procurement of goods or services for the company. For example, the employees may order stationary, computer hardware, or removal services by creating an internal request. The internal request can be fulfilled by an issue of a purchase request to the purchasing department, a reservation of goods from stock, or a production request.

The Human Capital Management deployment unit 818 includes a Time and Labor Management process component 848. The Time and Labor Management process component 848 supports the definition of employees' planned working time as well as the recording or the actual working times and absences and their evaluation.

The foundation layer includes a Source of Supply Determination process component 834, a Customer Invoice Processing at Supplier process component 837, a Sales Order Processing at Supplier process component 846, a Payment Processing at Business Partner process component 850, a Bank statement creation at bank process component 852, and a Payment order processing at house bank process component 854.

The service procurement design includes a Source of Supply Determination process component 834 that uses two business objects to determine a source of supply: a supply quota arrangement business object, and a source of supply business object. A supply quota arrangement is a distribution of material requirements or goods to different sources of supply, business partners, or organizational units within a company. An example of the use of supply quota arrangements is the distribution of material requirements between in-house production and different sources for external procurement. A supply quota arrangement can also define the distribution of goods to customers in case of excess production or shortages. A source of supply is an object that describes a logical link between a possible source of products and a possible target.

A number of external process components, described below, will be used to describe the architectural design. These include a Customer Invoice Processing at Supplier process component 837, a Sales Order Processing at Supplier process component 846, a Payment Processing at Business Partner process component 850, a Bank statement creation at bank process component 852, and a Payment order processing at house bank process component 854.

The Supplier Invoicing deployment unit 808 receives messages from a Customer Invoice at Supplier processing component 837, which is used, at a supplier, to charge a customer for the delivery of goods or services.

The service procurement design includes a Sales Order Processing at Supplier process component 846 that may receive messages from the RFQ Processing process component 840. The Sales Order Processing at Supplier process component 846 handles customers' requests to a company for delivery of goods or services at a certain time. The requests are received by a sales area, which is then responsible for fulfilling the contract.

The Payment Processing at Business Partner process component 850, the Bank statement creation at bank process component 852, and the Payment order processing at house bank process component 854 may interact with the Payment Processing process component 838. The Payment Processing Process component 838 may send updates to a Payment Processing at Business Partner processing component 850, which is used to handle, at business partner, all incoming and outgoing payments and represent the main data base for the liquidity status. The Payment Processing Process component 838 also receives messages from the Bank statement creations at bank process component 852. The message may include a bank Statement for a bank account. The Payment Processing Process component 838 sends messages to the Payment order processing at house bank process component 854. The message may include a Bank Payment Order that is a Payment Order which will be sent to a house bank. The bank payment order may contain bank transfers as well as direct debits.

The connector 829 symbol is a graphical convention to improve graphical layout for human reading. A connector is a placeholder for another process component. For example, the connector 829 could be a placeholder for an Accounting process component.

Figures 9, 9A:
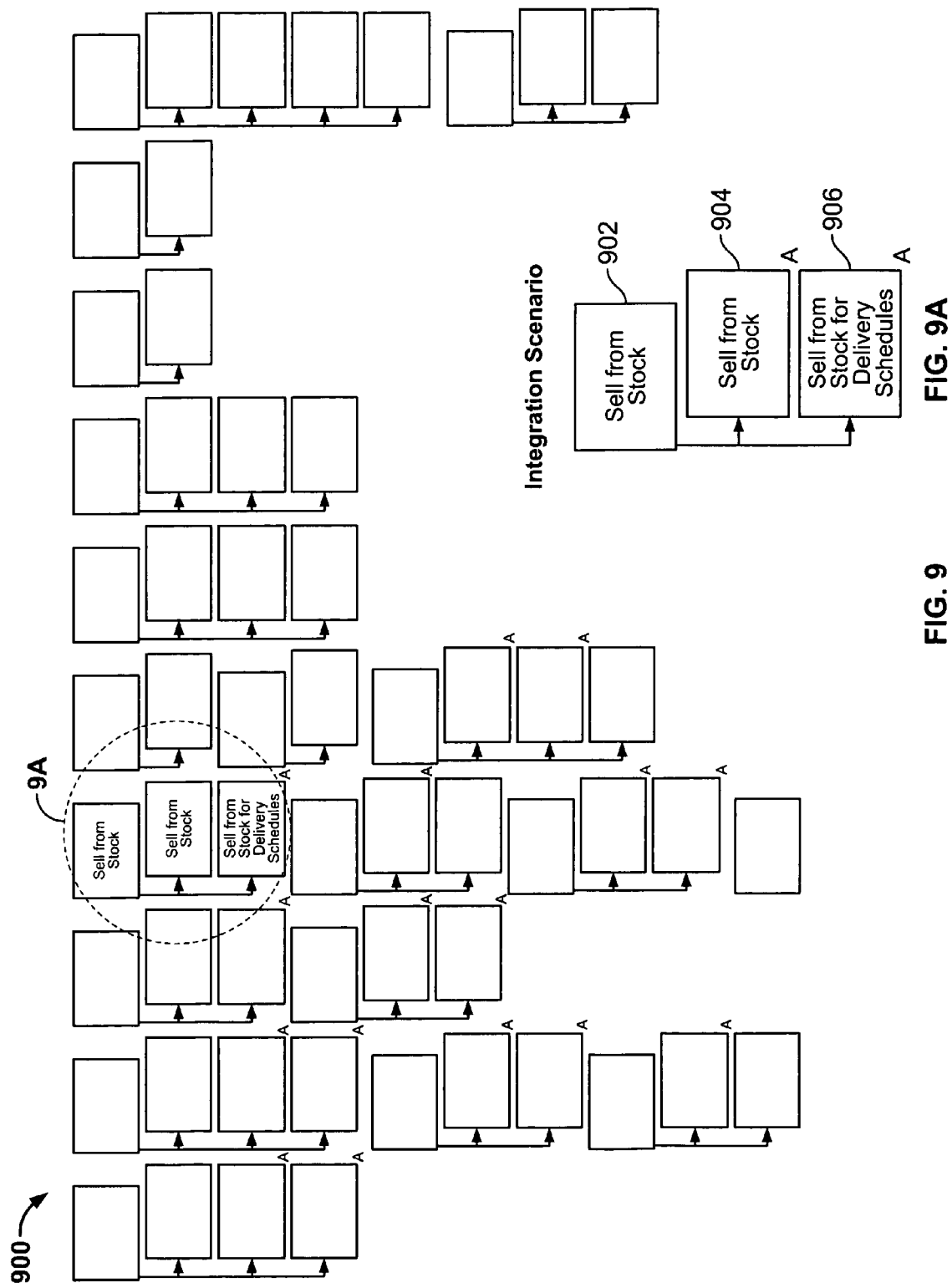
FIGS. 9-9A illustrate an integration scenario catalog.

FIGS. 9-9A illustrate an integration scenario catalog (or "scenario catalog") 900. A scenario catalog presents an organized view of a collection of integration scenarios. The view can be organized in a number of ways, including hierarchically or associatively based on one or more attributes of the integration scenarios. The illustrated integration scenario catalog 900 represents a structured directory of integration scenarios. For example, a scenario directory Sell from Stock 902 representing a family of scenarios includes two entries: a reference to a Sell from Stock integration scenario 904, and a reference to a Sell from Stock for Delivery Schedules integration scenario 906.

Figure 10A:
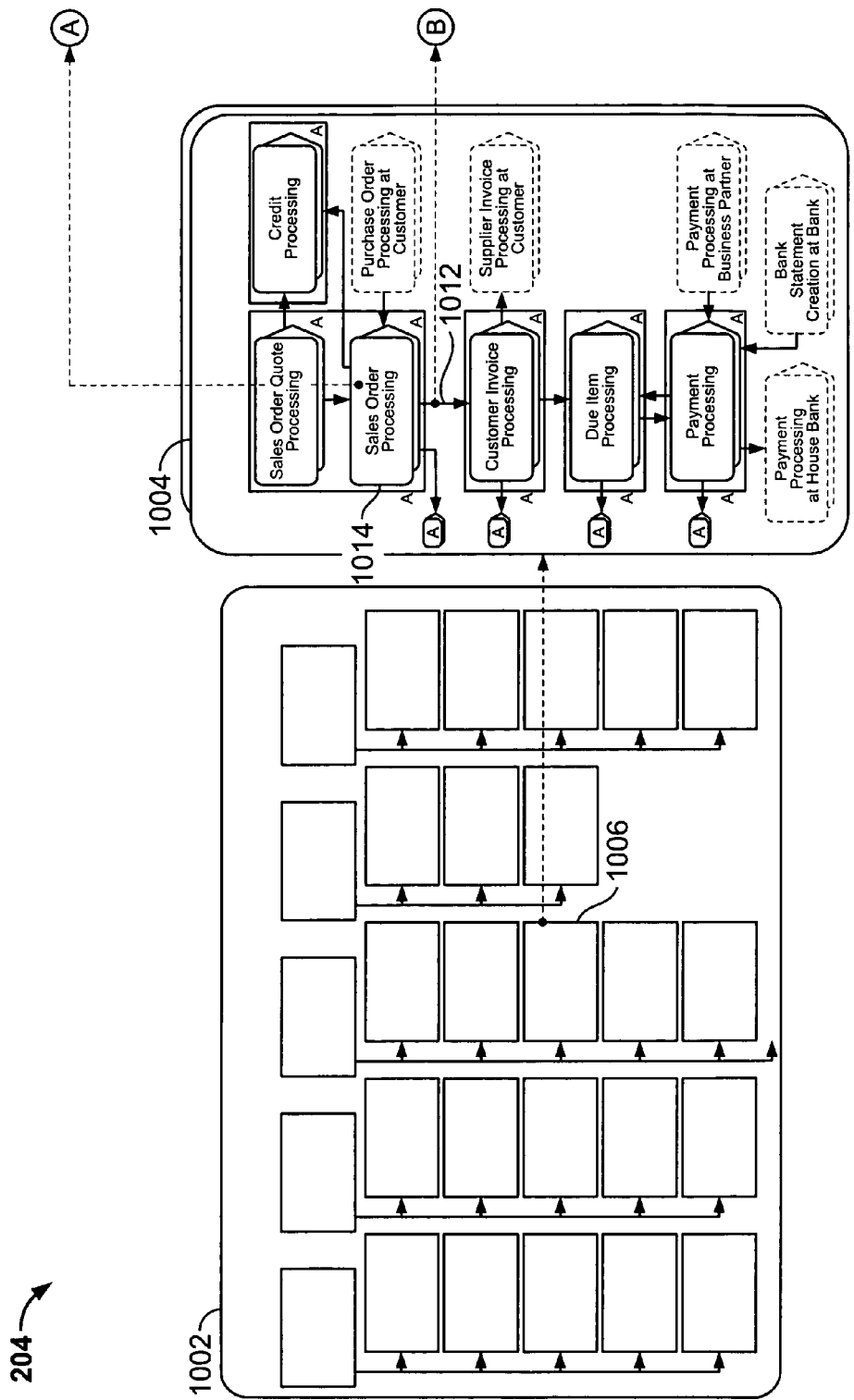
FIGS. 10A-B illustrate a GUI for presenting one or more graphical depictions of views of a model and modeling entities.
Figure 10B:
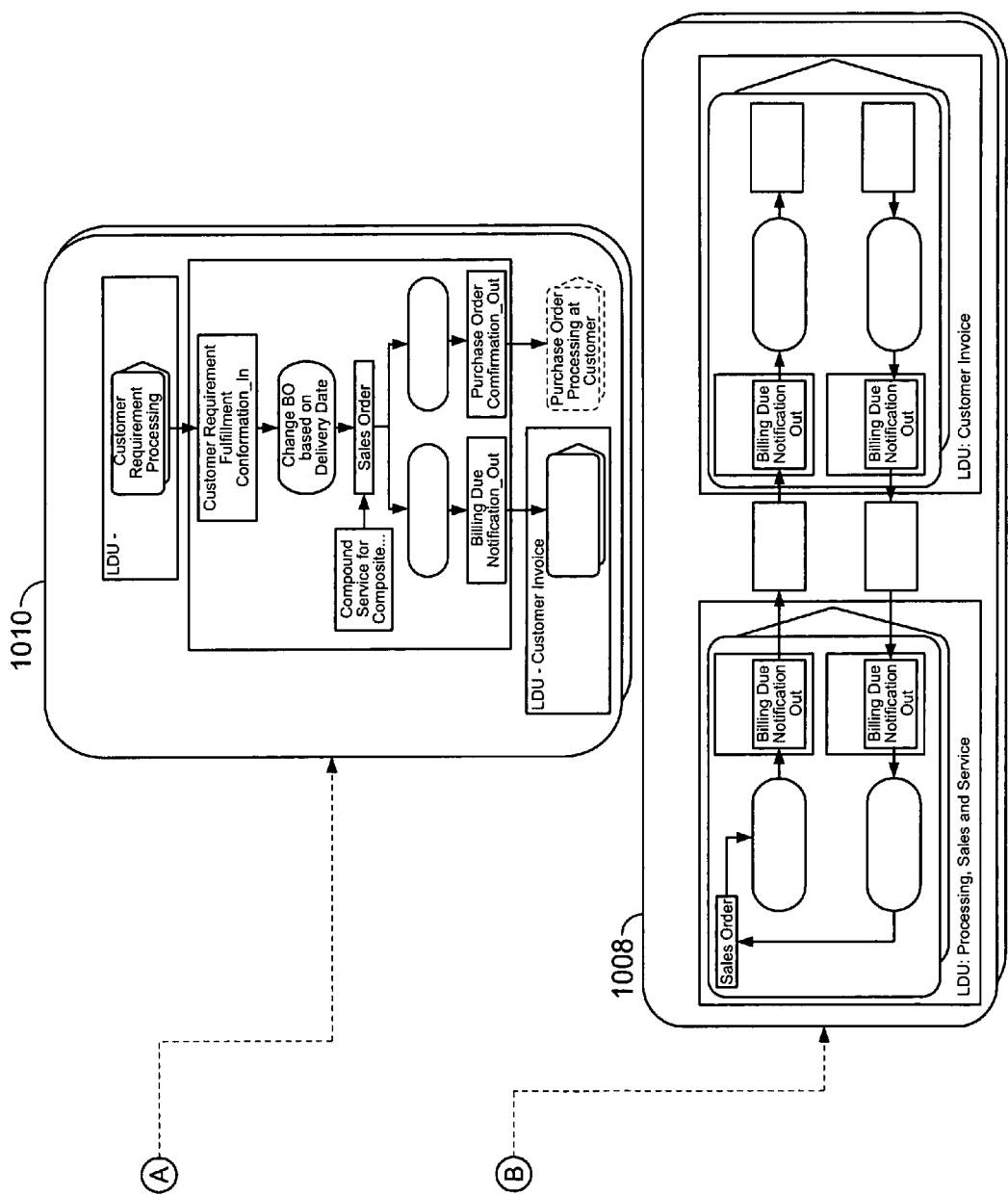

FIGS. 10A-B illustrate one example the GUI 204 (from FIG. 2) for presenting one or more graphical depictions of views of a model and modeling entities. Each view can present a different level of detail or emphasize a different aspect of the model. This allows for different classes of users to focus on the information that is important for carrying out their duties without being distracted by extraneous detail. One or more of the following graphical depictions can be presented: a scenario catalog 1002, an integration scenario model 1004, a PCIM 1008, and a PCM 1010. In one variation, the GUI 204 allows a user to "drill down" to increasing levels of model detail. For example, selection of a scenario icon 1006 in the integration scenario catalog 1002 can cause an associated integration scenario model 1004 to be presented. Selection of a graphical representation of a process component 1014 in the integration scenario can cause an associated PCM 1010 for the process component to be presented. Likewise, selection of an arc 1012 connecting process components in different deployment units can cause a PCIM 1008 for the prdcess components connected by the arc to be presented.

In one implementation, the aforementioned graphical depictions can be presented singularly or in combination with each other in the GUI 204. Moreover, a given graphical depiction can present all of its underlying information or a portion thereof, while allowing other portions to be viewed through a navigation mechanism, e.g., user selection of a graphical element, issuance of a command, or other suitable means.

Information can also be represented by colors in the display of model entities. For example, color can be used to distinguish types of business objects, types of process agents and types of interfaces.

Figure 11:
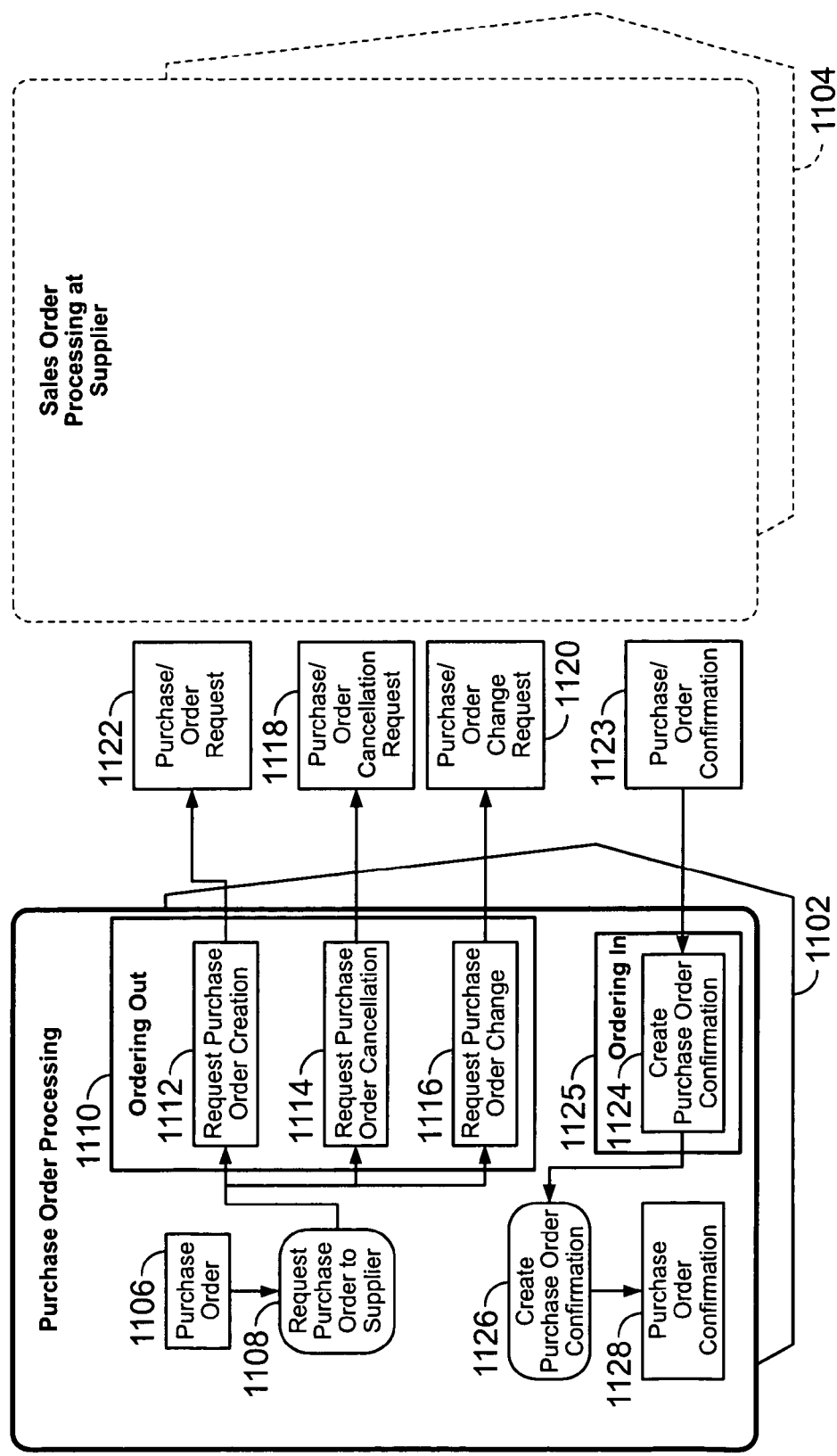
FIG. 11 is an illustration of process component interaction with an external process component.

FIG. 11 is an illustration of process component interaction with an external process component, representing an external system. As discussed earlier, a process component can interact with an external process component. This interaction can be modeled even though the interfaces of the external process are unknown, as is the case in this example. (However, if this information is known, it can be incorporated into the model.)

In this example, potential interactions are shown between a Purchase Order Processing process component 1102 and an external Sales Order Processing at Supplier process component 1104. The Purchase Order Processing process component 1102 includes a Purchase Order business object 1106 which is a request from a purchaser to an external supplier to deliver a specified quantity of goods, or perform a specified service, within a specified time. The Request Purchase Order to Supplier outbound process agent 1108 can request invocation of a Request Purchase Order Creation operation 1112, a Request Purchase Order Cancellation operation 1114, or a Request Purchase Order Change operation 1116 in an Ordering Out interface 1110.

The Request Purchase Order Cancellation operation 1114 requests a Cancellation of a Purchase Order that was formerly ordered at a supplier which creates a Purchase Order Cancellation Request message 1118. The Request Purchase Order Change operation 1116 requests a change of a purchase order that was formerly ordered at the supplier which creates a Purchase Order Change Request message 1120. The Request Purchase Order Creation operation 1112 requests a Purchase Order from a Supplier which creates a Purchase Order Request 1122.

Upon receiving a create, a change, or a cancellation message, the Sales Order Processing process component 1104 may create a Purchase Order Confirmation message 1123 to update the Purchase Order Processing component 1102. To complete the update, a Create Purchase Order Confirmation operation 1124, included in an Ordering In interface 1125, may transfer the update to the Purchase Order Confirmation business object 1128 by using a Create Purchase Order inbound process agent 1126. The Purchase Order Confirmation business object 1128 is a confirmation from an external supplier to the request of a purchaser to deliver a specified quantity of material, or perform a specified service, at a specified price within a specified time.

Figure 12:
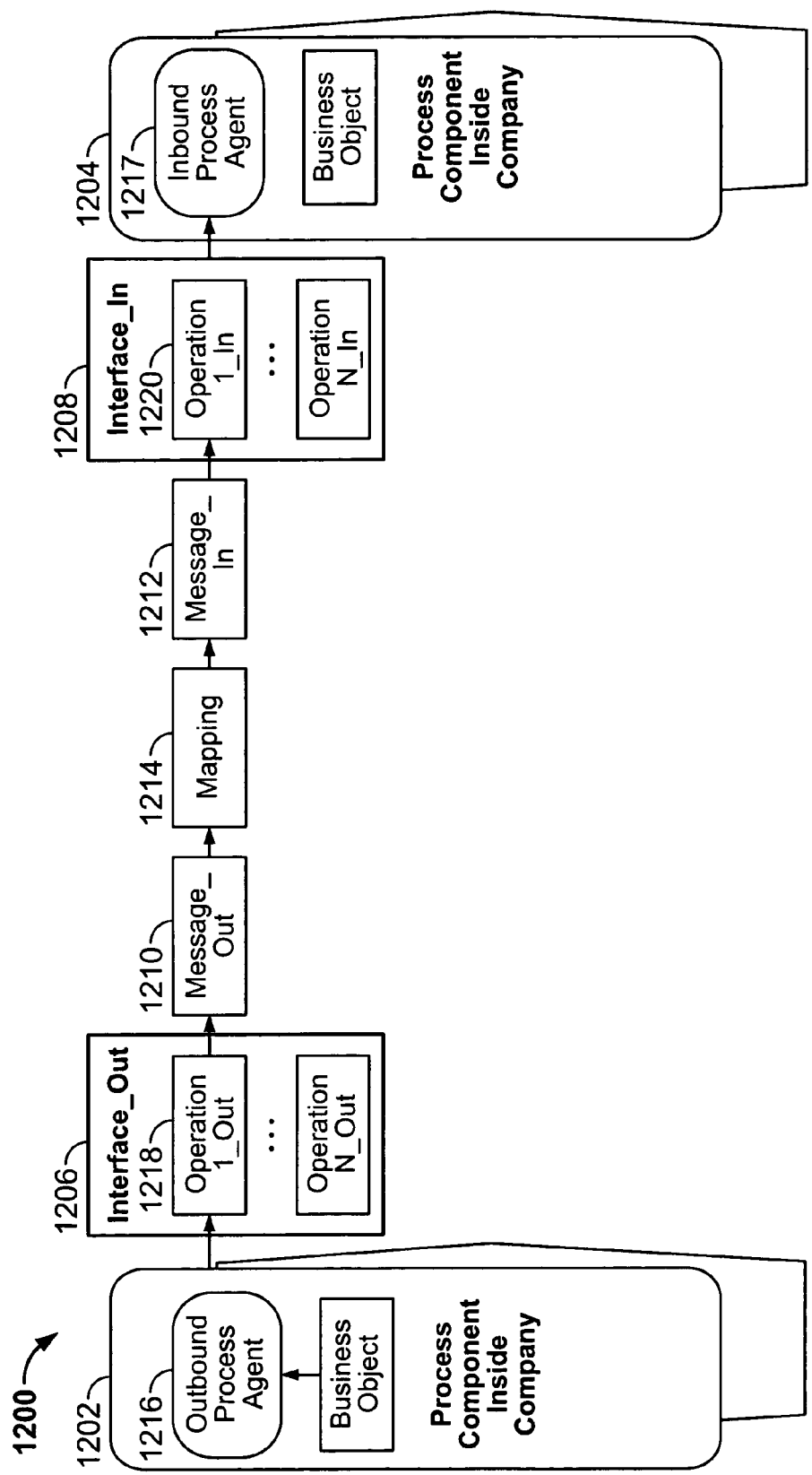
FIG. 12 is an illustration of process component interaction through a mapping model element.

FIG. 12 is an illustration 1200 of process component interaction through a mapping model element 1214 (or "mapper"). As discussed above, if message formats between two process component operations do not match, the message can be transformed by a mapper on its way from the outbound process agent to the inbound process agent. For example, output process agent 1216 associated with process component 1202 can send a message 1210 to inbound process agent 1217 in process component 1204 by way of operation 1218 in interface 1206. If the message format associated with operation 1218 does not match that of operation 1220, a transformation of the message from its original format to a format compatible with operation 1220 can be described by a mapper 1214 interposed between the two process agents. The mapper 1214 generates a new message 1212 based on the original message 1210, where the new message has a format that is compatible with operation 1220.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A software modeling system comprising at least one memory storing a software modeling tool and at least one processor executing the software modeling tool to perform operations, the operations comprising:

processing at least one input defining a plurality of business objects, each business object operable to encapsulate business data and associated with exactly one process component, each of the process components characterizing software implementing a respective and distinct process, and each of the process components defining a respective at least one service interface for communicating and interacting with business objects in other process components, wherein each service interface comprises at least one operation specific to only that service interface, the operation comprising a separately-callable function and all communication and interaction between process components taking place through the respective interfaces of the process components;

dividing the plurality of process components into multiple deployment units, wherein each deployment unit characterizes independently operable software, and each process component is entirely included in exactly one deployment unit; and processing at least one input defining context independent, pair-wise interactions among the plurality of business objects, wherein interaction between a first process component in a first deployment unit and a second process component in a second deployment unit external to the first deployment unit takes place through an incoming message to the first process component from the second process component in the second deployment unit through the respective service interfaces of the first and second process components, and interaction between the first process component and a third process component arranged in the same deployment unit takes place through business objects accessible to the first and third process components in the same deployment unit.

2. A system as in claim 1, wherein the process components characterize inbound operations to handle incoming messages associated with a modification of reading of data encapsulated in a business object associated with the process component.

3. A system as in claim 1, wherein the process components characterize outbound operations to handle outgoing messages associated with a modification or reading of data encapsulated in at least one business object associated with another process component.

4. A system as in claim 1, the operations further comprising generating, for each process component, at least one process agent, each process agent enabling communications between a business object associated with the process component and a business object associated with any other process component.

5. A system as in claim 4, wherein at least one of the process agents is an inbound process agent characterizing an inbound operation to handle incoming messages.

6. A system as in claim 5, wherein the inbound process agent is operable to receive a message of a first type and convert it into a message of a second type.

7. A system as in claim 4, wherein at least one of the process agents is an outbound process agent characterizing an outbound operation to transmit outgoing messages to an external process component.

8. A system as in claim 4, wherein each process agent is operable to communicate through the service interface of its respective process component.

9. A system as in claim 1, the operations further comprising: facilitating a logical association of the process components to realize a business scenario.

10. A system as in claim 1, the operations further comprising:

generating a plurality of integration scenarios, each integration scenario comprising a plurality of logically associated process components to realize a business scenario; and populating a catalog with the generated integration scenarios.

11. A system as in claim 1, the operations further comprising: polling a data repository to obtain stored data characterizing the plurality of deployment units.

12. A system as in claim 1, wherein at least a portion of communications between process components within one of the deployment units is not message based.

13. A system as in claim 1, wherein a first group of at least one process component is associated with a first deployment unit and a second group of at least one process component is associated with a second deployment unit, the deployment units characterizing independently operable software.

14. A system as in claim 13, wherein at least one of the deployment units comprises at least one business object that is not associated with one of the process components.

15. A system as in claim 14, wherein at least two of the deployment units are deployed on separate hardware platforms.

16. Apparatus comprising at least one non-transitory, computer-readable storage medium storing instructions, the instructions operable, when executed by at least one processor, to perform operations in a software modeling environment, the operations comprising:

processing at least one input defining a plurality of business objects, each business object operable to encapsulate business data and associated with exactly one process component, each of the process components characterizing software implementing a respective and distinct process, and each of the process components defining a respective at least one service interface for communicating and interacting with other business objects in other process components, wherein each service interface comprises at least one operation specific to only that service interface, the operation comprising a separately-callable function and all communication and interaction between process components taking place through the respective interfaces of the process components;

dividing the plurality of process components into multiple deployment units, wherein each deployment unit characterizes independently operable software, and each process component is entirely included in exactly one deployment unit; and processing at least one input defining context independent, pair-wise interactions among the plurality of business objects, wherein interaction between a first process component in a first deployment unit and a second process component in a second deployment unit external to the first deployment unit takes place through an incoming message to the first process component from the second process component in the second deployment unit through the respective service interfaces of the first and second process components, and interaction between the first process component and a third process component arranged in the same deployment unit takes place through messages passed between the first and third process components in the same deployment unit.

17. The apparatus of claim 16, the operations further comprising: processing at least one grouping of process components to form a plurality of deployment units.

18. The apparatus of claim 17, the operations further comprising: facilitating a logical association of the deployment units to realize a business scenario.

19. A computer-implemented method for grouping process components in a software modeling environment, the method comprising:
processing at least one input defining a plurality of business objects, each business object operable to encapsulate business data and associated with at least one process component, each of the process components characterizing software implementing a respective and distinct process, and each of the process components defining a respective at least one service interface for communicating and interacting with business objects in other process components, wherein each service interface comprises at least one operation specific to only that service interface, the operation comprising the smallest, separately-callable function and all communication and interaction between process components taking place through the respective interfaces of the process components;
dividing the plurality of process components into multiple deployment units, wherein each deployment unit characterizes independently operable software, and each process component is entirely included in exactly one deployment unit; and
processing at least one input defining context independent, pair-wise interactions among the plurality of foundation layer business objects, wherein interaction between a first process component in a first deployment unit and a second process component in a second deployment unit external to the first deployment unit takes place through an incoming message to the first process component from the second process component in the second deployment unit through the respective service interfaces of the first and second process components, and interaction between the first process component and a third process component arranged in the same deployment unit takes place through at least one of business objects accessible to the first and third process components in the same deployment unit or messages passed between the first and third process components in the same deployment unit.

20. The method of claim 19, wherein the at least one input defines the plurality of business objects in a foundation layer.

21. The method of claim 20, the plurality of business objects defined in the foundation layer comprising a first plurality of business objects, the operations further comprising: processing at least one input defining a second plurality of business objects external to the foundation layer, each external business object being associated with exactly one process component.

22. The apparatus of claim 16, the operations further comprising processing at least one input to associate each of the business objects with exactly one process component.

* * * * *